US011881364B2

(12) United States Patent
Cho

(10) Patent No.: US 11,881,364 B2
(45) Date of Patent: Jan. 23, 2024

(54) KNOB STRUCTURE OF USER INTERFACE DEVICE

(71) Applicant: SEOYON E-HWA CO., LTD., Anyang (KR)

(72) Inventor: Ju Hwan Cho, Incheon (KR)

(73) Assignee: SEOYON E-HWA CO., LTD., Anyang (KR)

( * ) Notice: Subject to any disclaimer, the term of this patent is extended or adjusted under 35 U.S.C. 154(b) by 0 days.

(21) Appl. No.: 17/820,599

(22) Filed: Aug. 18, 2022

(65) Prior Publication Data

US 2023/0135190 A1 May 4, 2023

(30) Foreign Application Priority Data

Oct. 29, 2021 (KR) .................. 10-2021-0146566

(51) Int. Cl.
*H01H 19/14* (2006.01)
*B60R 16/00* (2006.01)

(52) U.S. Cl.
CPC ........... *H01H 19/14* (2013.01); *B60R 16/005* (2013.01); *H01H 2231/026* (2013.01)

(58) Field of Classification Search
CPC ...... H01H 19/14; H01H 19/025; H01H 19/11; H01H 19/04; H01H 19/54; H01H 19/64; H01H 19/46; H01H 19/10; H01H 19/03; H01H 19/38; H01H 19/001; H01H 19/02; H01H 19/06; H01H 19/08; H01H 19/20; H01H 19/36; H01H 19/00; H01H 19/50; H01H 19/56; H01H 19/60; H01H 19/62; G05G 1/08; G05G 1/10; G05G 1/02; G05G 1/105; G05G 1/12
See application file for complete search history.

(56) References Cited

U.S. PATENT DOCUMENTS

| | | | |
|---|---|---|---|
| 2017/0153718 A1* | 6/2017 | Brown | B60K 37/06 |
| 2018/0301301 A1* | 10/2018 | Bach | F24C 7/082 |

FOREIGN PATENT DOCUMENTS

| | | |
|---|---|---|
| CN | 113179049 A | 7/2021 |
| JP | 3234347 B2 | 12/2001 |
| JP | 6226425 B2 | 11/2017 |
| JP | 2020160906 A | 10/2020 |
| KR | 10-2021-0087282 A | 7/2017 |
| KR | 101829376 B1 | 2/2018 |
| KR | 101955419 B1 | 5/2019 |

OTHER PUBLICATIONS

KR OA dated Dec. 14, 2021.
KR Grant dated Feb. 25, 2022.

* cited by examiner

*Primary Examiner* — Ahmed M Saeed
(74) *Attorney, Agent, or Firm* — Harvest IP Law, LLP

(57) ABSTRACT

Disclosed herein a user interface device includes a hinge configured to slide in a first direction along a rail extending in the first direction; and a knob coupled to the hinge to slide in the first direction and configured to detect a rotation input; wherein the knob includes a knob base coupled to the hinge, a bearing including a first member coupled to the knob base and a second member rotatable about a rotation axis with respect to the first member, and a knob body coupled to the second member and configured to rotate with respect to the knob base, wherein the knob body is detachably coupled to the second member.

7 Claims, 9 Drawing Sheets

[FIG. 1]
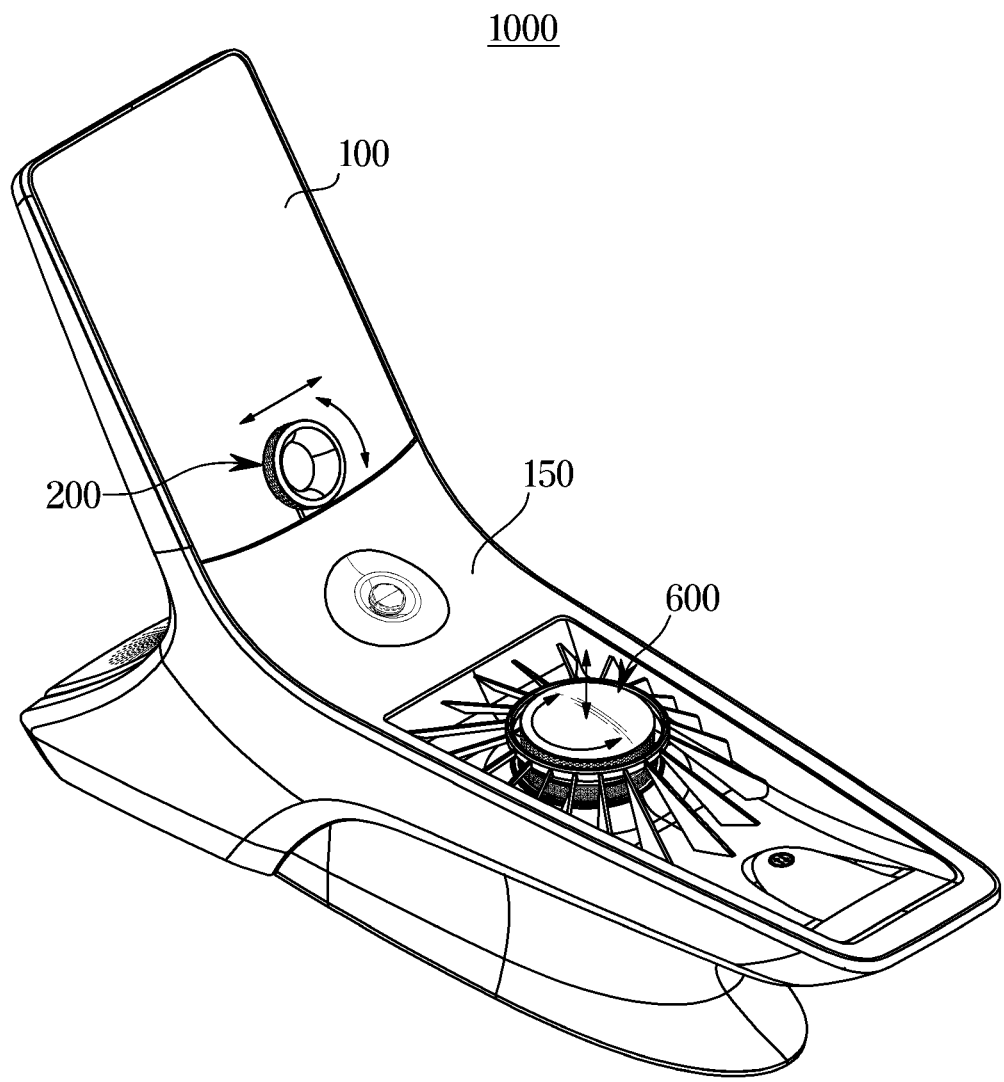

[FIG. 2]
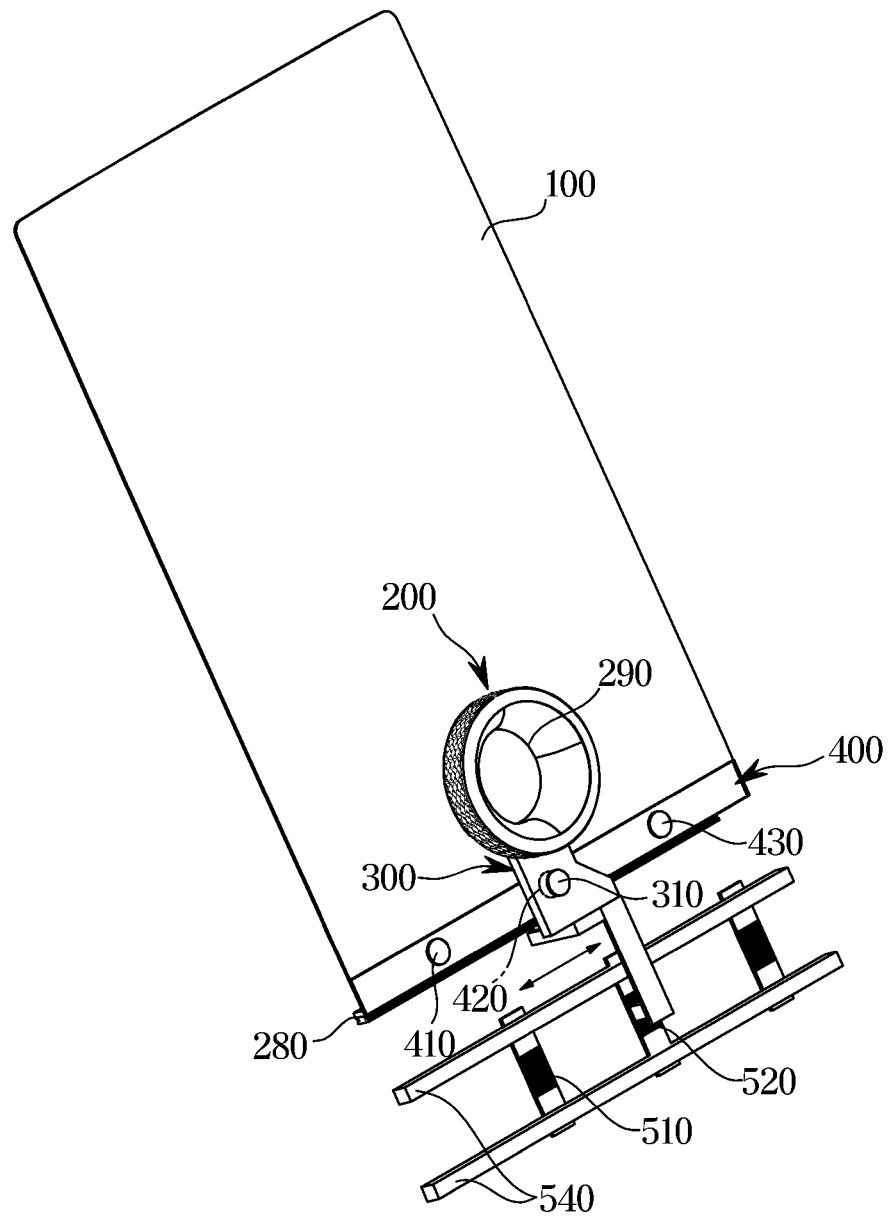

[FIG. 3]
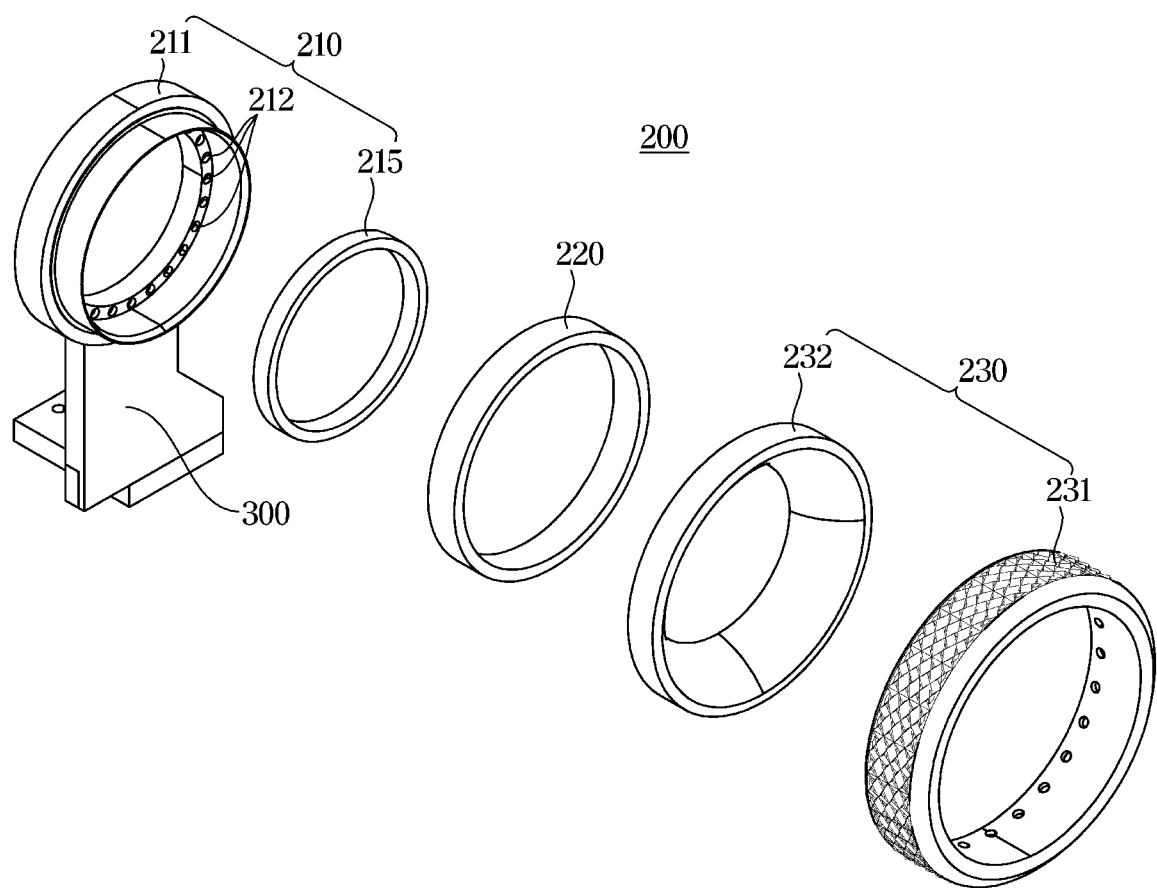

[FIG. 4]
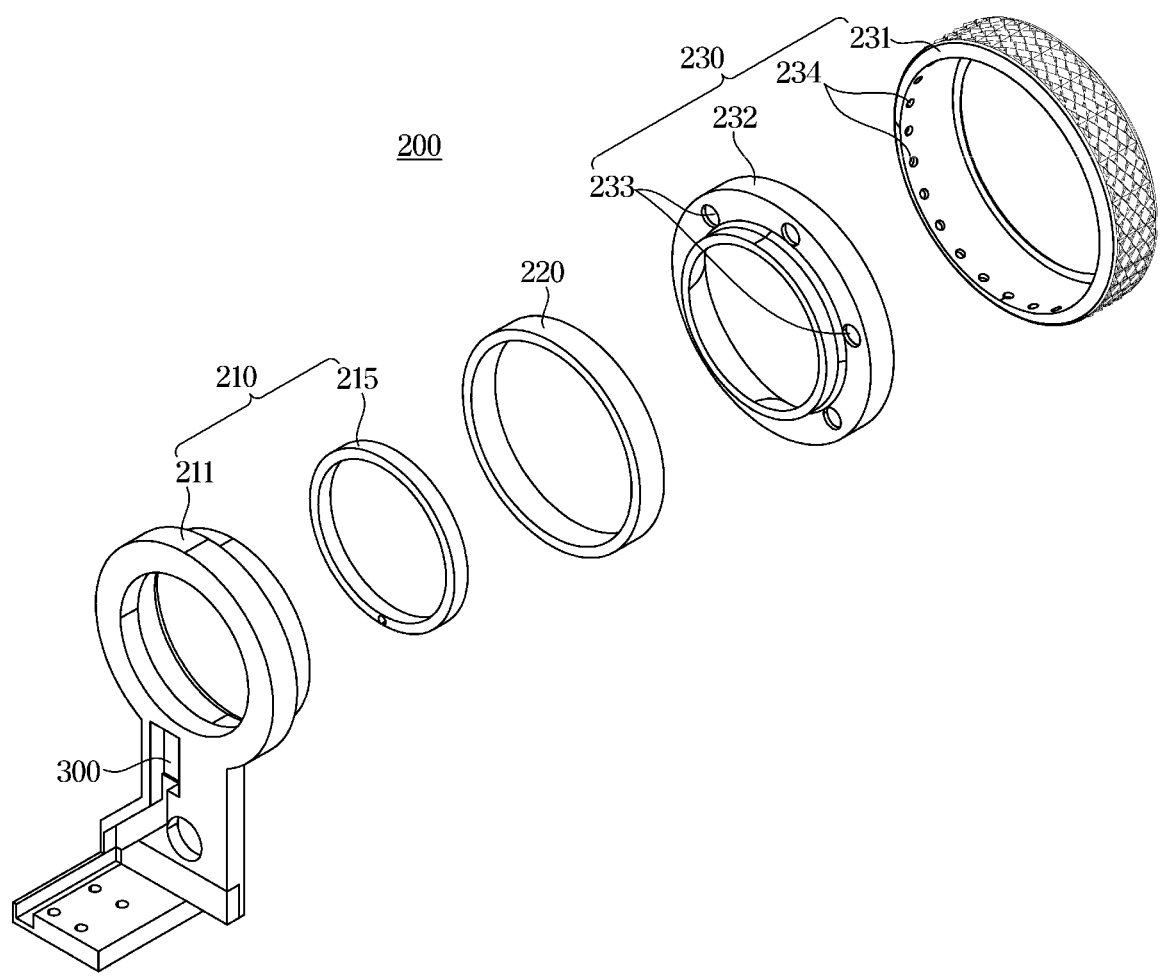

[FIG. 5]
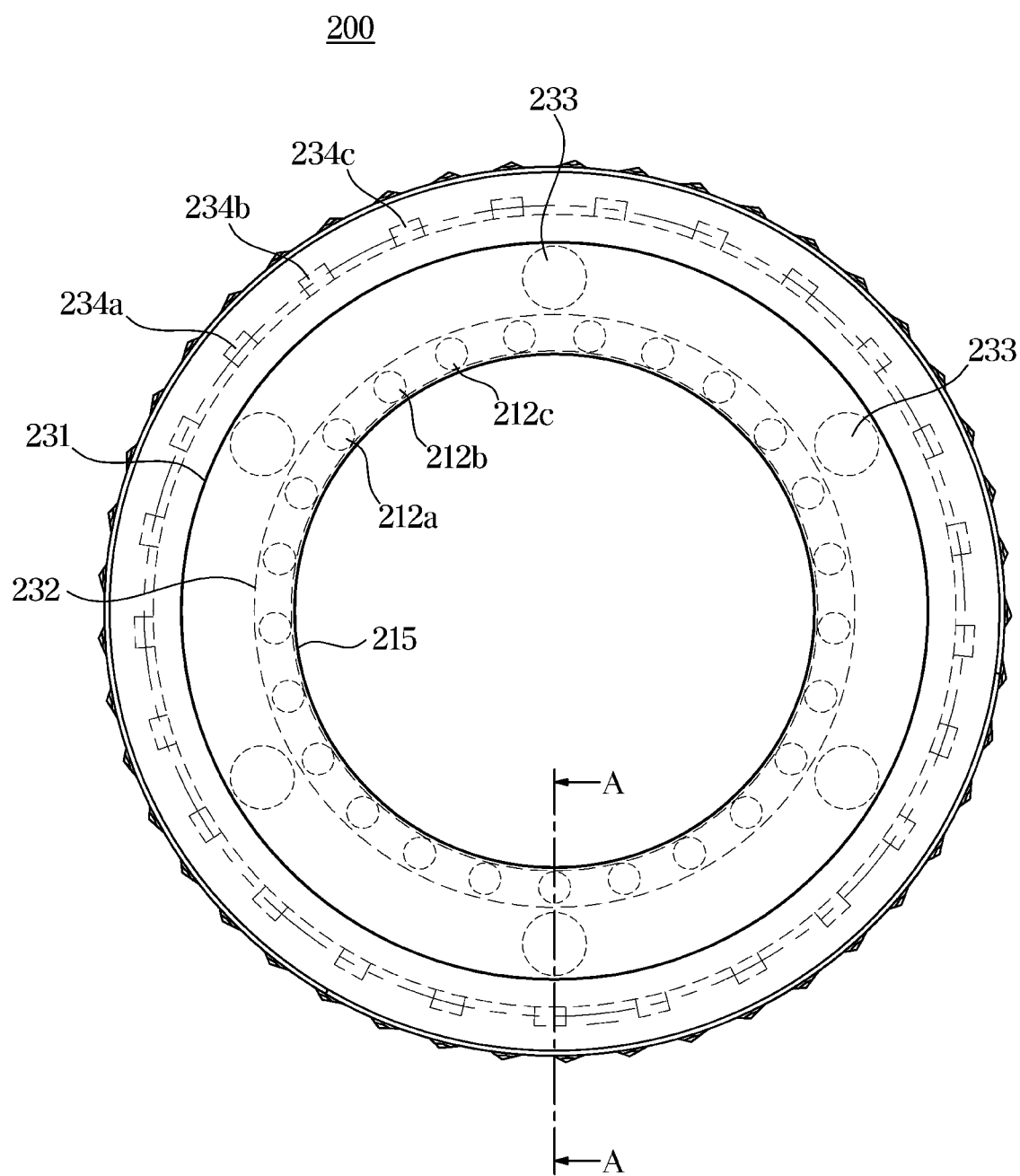

【FIG. 6A】
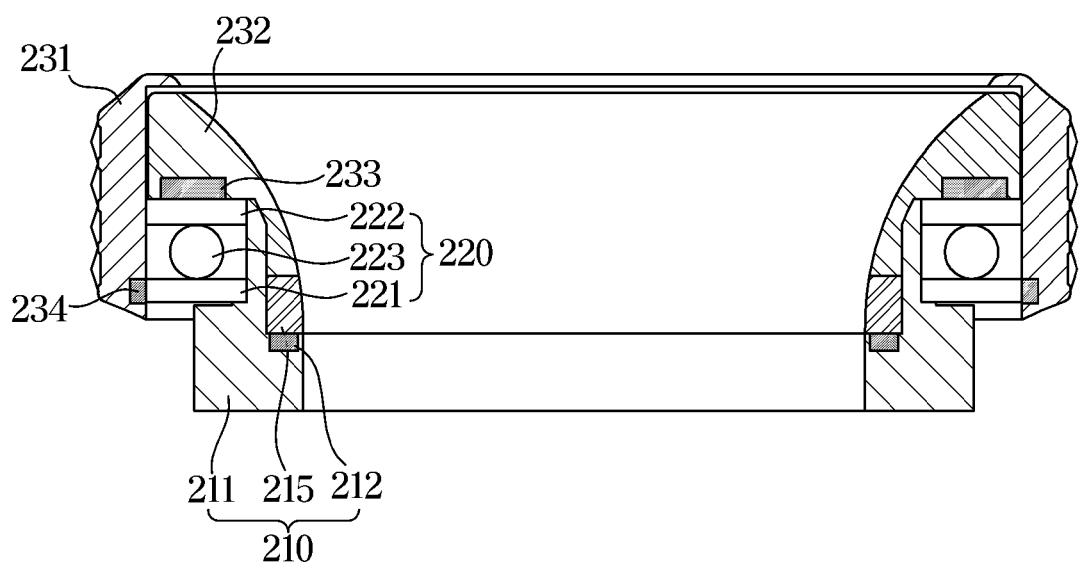

[FIG. 6B]
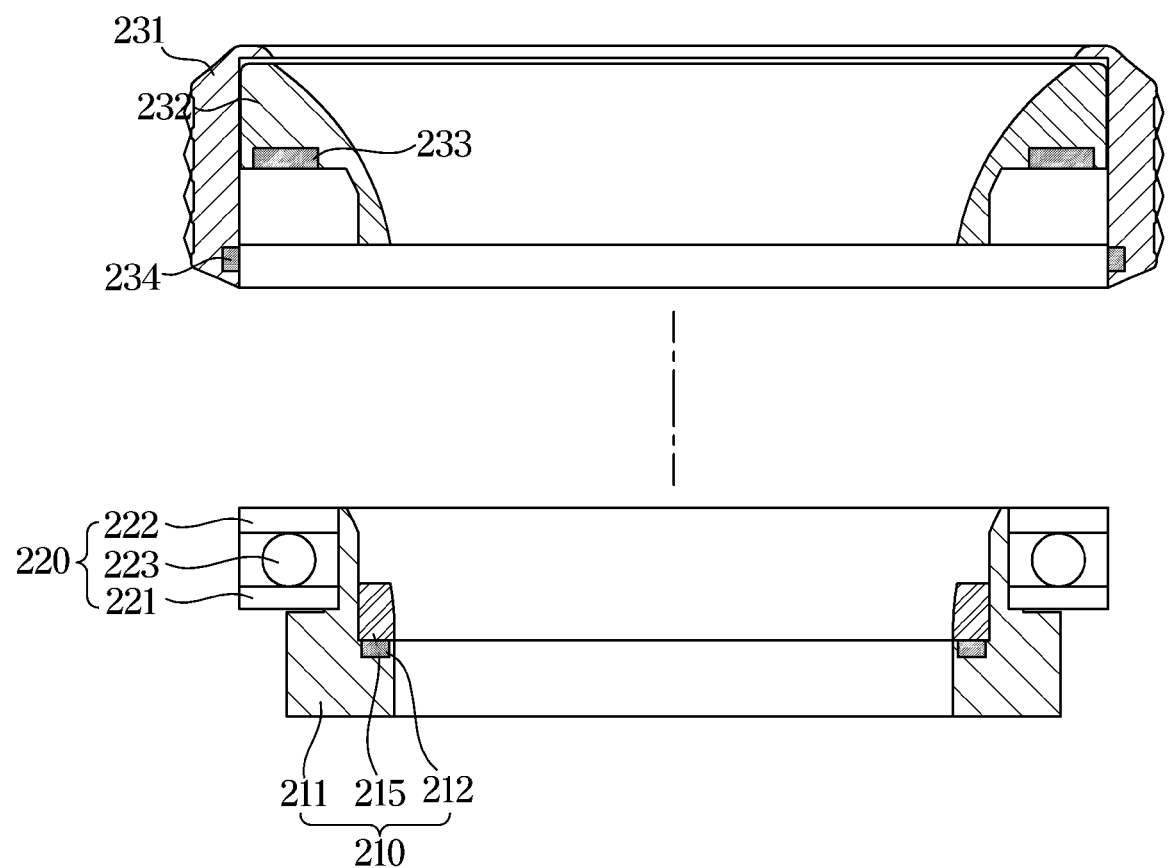

[FIG. 7]
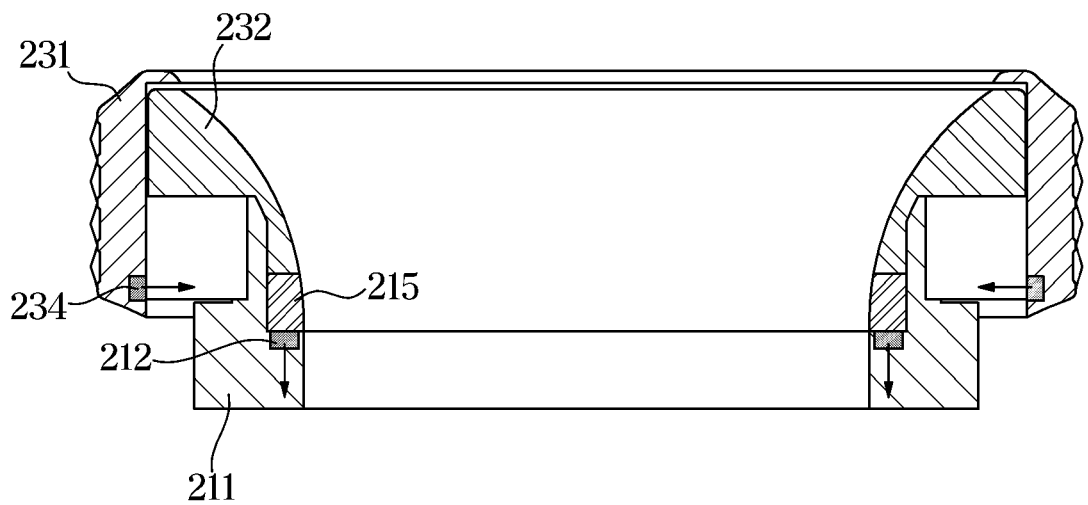
[FIG. 8]
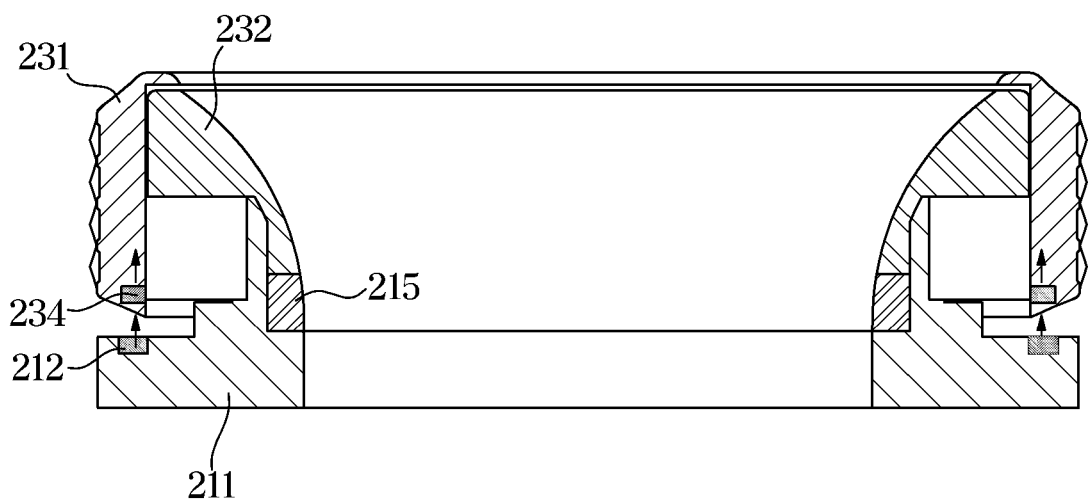

[FIG. 9]
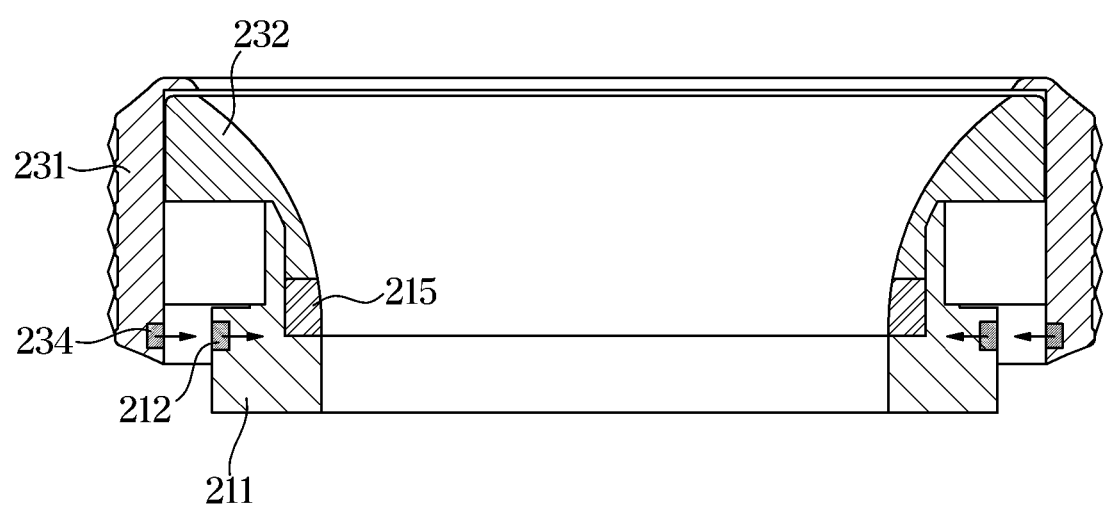

KNOB STRUCTURE OF USER INTERFACE DEVICE

CROSS-REFERENCE TO RELATED APPLICATION

This application is based on and claims priority under 35 U.S.C. § 119 to Korean Patent Application 10-2021-0146566, filed on Oct. 29, 2021 in the Korean Intellectual Property Office, the disclosure of which is incorporated herein by reference in its entirety.

The disclosure relates to a knob structure of a user interface device, and more particularly, to a knob structure of a user interface device that is easily detachable using a magnet.

In general, vehicles have a center fascia, which is provided with various systems that may be controlled by a user. For example, such various systems provided in a center fascia of a vehicle include navigation, radio, and air conditioning control system, and the like. To control such various systems, an input device for receiving a user's input may be provided.

Meanwhile, an output device for outputting information from such various systems may be provided in a center fascia of a vehicle. Conventionally, simple output devices such as an indicator lamp are provided in order to output information, but nowadays, a large display may be utilized in order to output various information to a user as needed. Furthermore, by providing a touch input means in a large display device, a user may intuitively perform an input according to output contents.

Recently, as a device for manipulating in-vehicle devices, development of knob-on-display technologies that may provide driving environment information through a display and control in-vehicle systems through a physical manipulation method has been ongoing. A knob allows a driver to manipulate devices precisely without taking their eyes off a road, and enables intuitive and physical control through a moderate sense of resistance.

However, such a knob may detect only a simple rotation input, so research on a user interface device that allows a user to control a system through various inputs is required.

SUMMARY

An aspect of the disclosure is to provide a knob structure of a user interface device that is easily detachable using a magnet.

Additional aspects of the disclosure will be set forth in part in the description which follows and, in part, will be obvious from the description, or may be learned by practice of the disclosure.

In accordance with an aspect of the disclosure, a user interface device includes a hinge configured to slide in a first direction along a rail extending in the first direction; and a knob coupled to the hinge to slide in the first direction and configured to detect a rotation input; wherein the knob includes a knob base coupled to the hinge, a bearing including a first member coupled to the knob base and a second member rotatable about a rotation axis with respect to the first member, and a knob body coupled to the second member and configured to rotate with respect to the knob base, wherein the knob body is detachably coupled to the second member.

The second member may be provided as a magnetic material, and the knob body may be provided with a plurality of first magnets having a predetermined radius based on a center of rotation and arranged along a circumferential direction, the knob body coupled to the second member.

The knob body may be provided with a plurality of second magnets having a first predetermined radius based on a center of rotation and arranged at equal intervals along a circumferential direction, and the knob base may be provided with a plurality of third magnets having a second predetermined radius based on a center of rotation and arranged at equal intervals along a circumferential direction, the number of third magnets equaling to the number of the second magnets.

Polarities of the plurality of second magnets and the plurality of third magnets may be arranged in a direction in which attractive force is applied to each other.

In accordance with another aspect of the disclosure, a user interface device includes a display; a rail extending in a first direction parallel to the display at one side of the display; a hinge configured to slide along the rail in the first direction; and a knob coupled to the hinge to slide in the first direction on a display surface of the display and configured to detect a rotation input; wherein the knob includes a knob base coupled to the hinge, a bearing including a first member coupled to the knob base and a second member rotatable about a rotation axis with respect to the first member, and a knob body coupled to the second member to rotate with respect to the knob base, wherein the knob body is detachably coupled to the second member.

The knob may include a hollow portion, and an image displayed on the display may be seen through the hollow portion.

The knob body is partially or entirely formed of a light-transmitting material, so that the image displayed on the display may be seen through the knob body.

BRIEF DESCRIPTION OF THE DRAWINGS

These and/or other aspects of the disclosure will become apparent and more readily appreciated from the following description of the exemplary embodiments, taken in conjunction with the accompanying drawings, of which:

FIG. 1 is a schematic view illustrating a user interface device according to an embodiment of the disclosure;

FIG. 2 is a schematic view illustrating a configuration of a user interface device according to an embodiment of the disclosure;

FIG. 3 is a schematic view illustrating a configuration of a knob according to an embodiment of the disclosure;

FIG. 4 is a schematic view illustrating a configuration of a knob according to an embodiment of the disclosure;

FIG. 5 is a schematic view illustrating an arrangement of a magnet provided in a knob according to an embodiment of the disclosure;

FIGS. 6A and 6B are schematic views illustrating a cross-section of a knob according to an embodiment of the disclosure;

FIG. 7 is a schematic view illustrating a polarity arrangement of a magnet of a knob according to an embodiment of the disclosure;

FIG. 8 is a schematic view illustrating a polarity arrangement of a magnet of a knob according to an embodiment of the disclosure; and FIG. 9 is a schematic view illustrating a polarity arrangement of a magnet of a knob according to an embodiment of the disclosure.

DETAILED DESCRIPTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a schematic view illustrating a user interface device according to an embodiment of the disclosure, and FIG. 2 is a schematic view illustrating a configuration of a user interface device according to an embodiment of the disclosure.

A user interface device 1000 may be provided on a center fascia of a vehicle to concisely provide driving environment information through a display 100, and at the same time, control an in-vehicle system through a physical manipulation method of a knob 200. The knob 200 may slidably move on a display surface of the display 100 and may detect a rotation input.

Referring to FIG. 2, the user interface device 1000 may include the display 100, a rail 280 provided to extend in a first direction (indicated by an arrow in FIG. 2) parallel to the display 100 on one side of the display 100, a hinge 300 sliding along the rail 280 in the first direction, the knob 200 coupled to the hinge 300 to slide in the first direction on the display surface of the display 100 and detect the rotation input, a magnet holder 400 disposed in a second direction of the hinge 300 opposite to the hinge 300 and extending in the first direction, and a hinge sensor 500 for detecting a position of the hinge 300.

Meanwhile, as shown in FIG. 1, the user interface device 1000 may further include a case 150 in which the rail 280, the magnet holder 400, and the hinge sensor 500 are accommodated therein so as not to be exposed to the outside. The case 150 may be provided to cover an area close to the knob 200 in order to minimize the exposure of the hinge 300, and the hinge 300 may have a surface similar to the material of the display 100 so as not to be not easily noticeable on the display 100.

The display 100 may display information necessary for a user. For example, the display 100 may be a touch display device including a touch panel (not shown). The user may input information into the user interface device 1000 through such a touch panel or may input information through a manipulation of the knob 200.

The knob 200 may detect a rotation input by a user's manipulation. To this end, the knob 200 may include a knob body that rotates about a rotation axis. The knob 200 may include a hollow portion 290.

The knob 200 is coupled to the hinge 300, and the hinge 300 may slide along the rail 280 in the first direction. Accordingly, the knob 200 may also slide in the first direction. At this time, the knob 200 may slide on the display surface of the display 100.

On the other hand, the hinge sensor 500 detects a position of the hinge 300. Because the hinge sensor 500 detects the position of the hinge 300, the user may input information into the user interface device 1000 through the hinge sensor 500 by sliding the knob 200 coupled to the hinge 300 to move the position of the hinge 300.

Accordingly, the user may input information by touching the display surface of the display 100, or may input information by sliding or rotating the knob 200 positioned on the display surface.

FIGS. 3 and 4 are schematic views illustrating a configuration of a knob according to an embodiment of the disclosure.

Referring to FIGS. 3 and 4, the knob 200 may include a knob base 210 coupled to the hinge 300, a bearing 220 coupled to the knob base 210, and a knob body 230 coupled to the bearing 220 to rotate with respect to the knob base 210.

Referring to FIGS. 3 and 4, the knob base 210 may include a base member 211 coupled to the hinge, and a ring member 215 coupled to the base member 211. As shown in FIG. 3, a plurality of third magnets 212 may be provided between the base member 211 and the ring member 215. The third magnet 212 will be described later.

The knob body 230 may include a grip member 231 forming an outer circumferential surface of the knob, and a connector member 232 coupling the grip member 231 to the bearing 220. As shown in FIG. 4, a plurality of first magnets 233 may be provided on the connector member 232, and a plurality of second magnets 234 may be provided on the grip member 231. The first and second magnets 233 and 234 will be described later.

In this case, the knob body 230 may be detachably coupled to the bearing 220.

Because the knob body 230 is detachably coupled to the bearing 220, the knob body 230 may be easily separated from the knob base 210 coupled to the hinge 300. Accordingly, the user may replace the knob body 230 by coupling other knob body 230b to the bearing 220 after separating the knob body 230a from the knob base 210 and the bearing 220. As a result, the user may use the knob body 230 having various materials, sizes, and designs, depending on a situation. For example, in the case of a user with a small hand, a feeling of manipulation of the knob 200 may be improved by combining the knob body 230 with a small diameter. In addition, the knob body 230 of a different color based on a user's taste may be combined to improve aesthetics. In addition, on a day when the temperature is low, cold feeling transmitted when the knob 200 is held may be reduced by replacing the knob body 230 made of a metal material with the knob body 230 made of a plastic material.

Meanwhile, because the knob 200 slides on the display surface of the display 100, an image displayed on the display 100 may be buried by the knob 200. At this time, the knob 200 may include the hollow portion 290, and the image displayed on the display 100 is visible through the hollow portion 290 so that the user may identify the image displayed on the display 100.

At this case, the knob body 230 according to an embodiment of the disclosure may be partially or entirely formed of a light-transmitting material so that the image displayed on the display 100 may be seen through the knob body 230. The user may see the image displayed on the display 100 through the knob body 230 by replacing the knob body 230 of such a light-transmitting material depending on a situation, or allow the knob body 230 to shine by the image displayed on the display 100 so that the knob serves as a decorative object.

FIG. 5 is a schematic view illustrating an arrangement of a magnet provided on a knob according to an embodiment of the disclosure, and FIG. 6 is a schematic view illustrating a cross-section of the knob according to an embodiment of the disclosure.

FIG. 5 is a plan view of the knob 200 and FIG. 6 is a cross-sectional view taken along A-A section of FIG. 5. Referring to FIG. 6A, the bearing 220 may include a first member 221, and a second member 222 rotatable about a rotation axis with respect to the first member 221. In this case, the first member 211 may be coupled to the knob base 210, and the second member 222 may be coupled to the knob body 230. Due to such a connection therebetween, the knob body 230 may be rotatably coupled to the knob base 210. Bearing balls 223 may be provided between the first and second members 221 and 222 to reduce friction during rotation.

The bearing 220 may be a thrust bearing in which the first and second members 221 and 222 are arranged to face each other in a rotation axis direction, as shown in FIG. 6, but the first and second members 221 and 222 may be a radial bearing in which the second member 222 is arranged face each other in a rotational radius direction.

The knob body 230 may be detachably coupled to the bearing 220 by being detachably coupled to the second member 222. At this time, the second member 222 is provided as a magnetic material, and the knob body 230 is provided with a plurality of first magnets 233 having a predetermined radius based on a center of rotation and arranged along a circumferential direction, so that the knob body 230 may be coupled to the second member 222.

Referring to FIG. 5, six first magnets 233 are provided in the circumferential direction of the connector member 232 of the knob body 230. On the other hand, FIG. 6A is a cross-sectional view taken along A-A section when the knob body 230 is coupled to the second member 222, and FIG. 6B is a cross-sectional view taken along A-A section when the knob body 230 is separated with the second member 222.

Referring to FIGS. 6A and 6B, the first magnets 233 are arranged below the connector member 232 to contact the second member 222 when the knob body 230 is coupled to the knob base 210, and are coupled to the second member 222 provided with a magnetic material. Accordingly, the knob body 230 may be coupled to the second member 222 to rotate with respect to the first member 221 by the bearing balls 223.

Meanwhile, the user may separate the knob body 230 with the second member 222 by holding the knob body 230 and applying force to be spaced apart the first magnet 233 and the second member 222.

Preferably, the first magnets 233 are arranged at equal intervals along the circumferential direction. When the first magnets 233 are arranged at equal intervals along the circumferential direction, first magnets may be symmetrically coupled to the second member 222, thereby achieving stable coupling.

On the other hand, in an embodiment of the disclosure, the knob body 230 is provided with the plurality of second magnets 234 having a first predetermined radius based on the center of rotation and arranged at equal intervals along the circumferential direction, and the knob base 210 is provided with the plurality of third magnets 212 with a second predetermined radius based on the center of rotation and arranged at equal intervals along the circumferential direction. At this time, the number of third magnets 212 equals to the number of second magnets 234. In the embodiment shown in FIG. 5, the second and third magnets 234 and 212 are arranged in 25 pieces, respectively.

The third magnets 212 are provided on the knob base 210 and are fixedly disposed. Meanwhile, the second magnets 234 are provided on the knob body 230 and rotates together with the rotation of the knob body 230. In this case, polarities of the plurality of second and third magnets 234 and 212 may be arranged in a direction in which attractive force is applied to each other.

In a position shown in FIG. 5, the second magnets 234 create a force in a direction that resists or induce rotation by applying an attraction force to the third magnet 212 facing each other. For example, one second magnet 234a applies an attractive force to the third magnet 212a facing each other, and another second magnet 234b applies an attractive force to the third magnet 212b facing each other, and another second magnet 234c applies an attractive force to the third magnet 212c facing each other. As such, because the second magnets 234 and the third magnets 212 are applied an attractive force to each other at positions facing each other, when the knob body 230 rotates clockwise, a force that resists increasing distance between the second magnet 234 and the third magnet 212 facing each other is generated. In this case, when one second magnet 234a is closer to the adjacent third magnet 212b than the facing third magnet 212a as the knob body 230 continues to rotate, the attractive force between the second magnet 234a and the third magnet 212b adjacent to the second magnet 234a becomes greater than the attractive force between the second magnet 234a and the third magnet 212a facing the second magnet 234a. Likewise, the attractive force between another second magnet 234b and the adjacent third magnet 212c becomes greater than the attractive force between the second magnet 234b and the facing third magnet 212b. As such, the attractive force between the second magnets 234 and the adjacent third magnets 212 generates a force in a direction inducing rotation of the knob body 230, leading to the second magnets 234 and the adjacent third magnets 212 facing each other.

In the embodiment in which the 25 second and third magnets 234 and 212 are arranged as shown in FIG. 5, the force resisting rotation and the force inducing rotation are appeared alternately whenever the knob body 230 rotates 14.4 degrees. Accordingly, when a user holds the knob body 230 and rotates, feedback on the rotation is provided to the user, thereby improving manipulation feeling.

FIGS. 7 to 9 are schematic views illustrating a polarity arrangement of magnets of a knob according to an embodiment of the disclosure. Each drawings is cross-sectional view taken along A-A section of the knob 200 of FIG. 5 as shown in FIG. 6, and the bearing 220 is omitted for convenience of description.

Polarities of the plurality of second magnets 234 and the plurality of third magnets 212 may be arranged in a direction in which attractive forces are applied to each other. FIGS. 7 to 9 show various embodiments in which the second magnets 234 and the third magnets 212 are arranged on the knob body 230 and the knob base 210, respectively.

In the embodiment shown in FIG. 7, the second magnets 234 have a first predetermined radius with respect to the center of rotation and are arranged at equal intervals along the circumferential direction. At this time, the polarity of the second magnets 234 may be arranged in the direction of the rotation radius. In FIG. 7, the polarity of such magnets is indicated by an arrow, and the polarity of the second magnets 234 is arranged to face the center of rotation (right side) in the rotation radius.

Meanwhile, the third magnets 212 have a second predetermined radius based on the center of rotation and are arranged at equal intervals along the circumferential direction. In this case, the second predetermined radius may be smaller than the first predetermined radius. Meanwhile, the third magnets 212 may be arranged to be shifted from the second magnets 234 to one side in a direction of the rotation axis. In the embodiment shown in FIG. 7, the third magnets 212 are placed downward from the second magnets 234 in the direction of the rotation axis.

At this time, the polarity of the third magnets 212 may be arranged in the direction of the rotation axis to apply an attractive force to each other with the second magnets 234. In the embodiment shown in FIG. 7, the polarity of the third magnets 212 may be arranged as indicated by an arrow to apply an attractive force to each other with the second magnets 234. Because the third magnets 212 are shifted downward from the second magnets 234 in the direction of the rotation axis, the polarity of the third magnets 212 is also arranged to face downward in the direction of the rotation axis, so that the third magnets 212 may apply an attractive force to each other with the second magnets 234.

In the embodiment shown in FIG. 8, the second magnets 234 have a first predetermined radius with respect to the center of rotation and are arranged at equal intervals along the circumferential direction. In this case, the polarity of the second magnets 234 may be arranged in the direction of the rotation axis. In FIG. 8, the polarity of such magnets is indicated by an arrow, and the polarity of the second magnets 234 is arranged to face upward in the direction of the rotation axis.

Meanwhile, the third magnets 212 have a second predetermined radius based on the center of rotation and are arranged at equal intervals along the circumferential direction. In this case, the second predetermined radius may be the same as the first predetermined radius. In other words, the third magnets 212 may be arrange to face the second magnets 234 in the direction of the rotation axis. In the embodiment shown in FIG. 8, the third magnets 212 are disposed below the second magnets 234 in the direction of the rotation axis.

At this time, the polarity of the third magnets 212 may be arranged in the direction of the rotation axis to apply an attractive force to each other with the second magnet 234. In the embodiment shown in FIG. 8, the polarity of the third magnets 212 may be arranged as indicated by an arrow to apply an attractive force to each other with the second magnet 234. Because the third magnets 212 are arranged side by side in the direction of the rotation axis from the second magnets 234, the polarity of the third magnets 212 is also arranged to face upward in the direction of the rotation axis in the same way as the second magnets 234, so that the third magnets 212 may apply an attractive force to each other with the second magnets 234.

In the embodiment shown in FIG. 9, the second magnets 234 have a first predetermined radius based on the center of rotation and are arranged at equal intervals along the circumferential direction. At this time, the polarity of the second magnets 234 may be arranged in the direction of rotation radius. In FIG. 9, the polarity of such magnets is indicated by an arrow, and the polarity of the second magnets 234 is arranged to face the center of rotation (right side) in the rotation radius.

Meanwhile, the third magnets 212 have a second predetermined radius based on the center of rotation and are arranged at equal intervals along the circumferential direction. In this case, the second predetermined radius may be smaller than the first predetermined radius. Meanwhile, the third magnets 212 may be arranged to face the second magnets 234 in the rotation radius direction. In the embodiment shown in FIG. 9, the third magnets 212 are arranged closer to the center of rotation than the second magnets 234 along the rotation radius direction.

At this time, the polarity of the third magnets 212 may be arranged in the direction of the center of rotation to apply an attractive force to each other with the second magnets 234. In the embodiment shown in FIG. 9, the polarity of the third magnets 212 may be arranged as indicated by an arrow to apply an attractive force to each other with the second magnets 234. Because the third magnets 212 are arranged side by side in the direction of the rotation radius from the second magnets 234, the polarity of the third magnets 212 is also arranged to face the center of rotation in the rotation radius direction in the same way as the second magnet 234, so that the third magnets 212 may apply an attractive force to each other with the second magnets 234.

As show in FIGS. 7 to 9, the second magnets 234 and the third magnets 212 may be arranged in various positions, and by arranging the polarities in a direction in which attractive forces are applied to each other no matter where they are placed, feedback may be provided to the user when the knob body 200 rotates, thereby improving feeling of operation.

As described above, the user interface device 1000 according to an embodiment of the disclosure may be easily replaced by a user because the knob 200 for detecting the rotation input is easily detached, and also may use a magnet to provide feedback on the rotation when the knob 200 rotates, thereby improving the user's feeling of operation.

As is apparent from the above, embodiments of the disclosure may provide a user interface device that is easily replaced by a user because the knob for detecting the rotation input is easily detachable.

Further, embodiments of the disclosure may provide a user interface device capable of using a magnet to provide feedback on the rotation when the knob is rotated, thereby improving the user's feeling of operation.

Further, embodiments of the disclosure may provide a user interface device capable of improving aesthetic impression by allowing the displayed contents of the display located on the rear surface of the knob to be seen through the knob.

As described above, although a few embodiments of the disclosure have been shown and described, it would be appreciated by those skilled in the art that changes may be made in these embodiments without departing from the principles and spirit of the disclosure, the scope of which is defined in the claims and their equivalents.

The invention claimed is:

1. A user interface device, comprising:
   a hinge configured to slide in a first direction along a rail extending in the first direction; and
   a knob coupled to the hinge to slide in the first direction and configured to detect a rotation input;
   wherein the knob comprises:
   a knob base coupled to the hinge,
   a bearing including a first member coupled to the knob base and a second member rotatable about a rotation axis with respect to the first member, and
   a knob body coupled to the second member and configured to rotate with respect to the knob base;
   wherein the knob body is detachably coupled to the second member,
   wherein the knob body is provided with a plurality of second magnets having a first predetermined radius based on a center of rotation and arranged at equal intervals along a circumferential direction, and the knob base is provided with a plurality of third magnets having a second predetermined radius based on a renter of rotation and arranged at equal intervals along a circumferential direction, the number of third magnets equaling to the number of the second magnets.

2. The user interface device of claim 1, wherein
the second member is provided as a magnetic material, and
the knob body is provided with a plurality of first magnets having a predetermined radius based on a center of rotation and arranged along a circumferential direction, the knob body coupled to the second member.

3. The user interface device of claim 1, wherein polarities of the plurality of second magnets and the plurality of third magnets are arranged in a direction in which attractive force is applied to each other.

4. A user interface device, comprising:
a display;
a rail extending in a first direction parallel to the display at one side of the display;
a hinge configured to slide along the rail in the first direction; and
a knob coupled to the hinge to slide in the first direction on a display surface of the display and configured to detect a rotation input;
wherein the knob comprises:
a knob base coupled to the hinge,
a bearing including a first member coupled to the knob base and a second member rotatable about a rotation axis with respect to the first member, and
a knob body coupled to the second member to rotate with respect to the knob base,
wherein the knob body is detachably coupled to the second member,
wherein the knob body is provided with a plurality of second magnets having a first predetermined radius based on a center of rotation and arranged at equal intervals along a circumferential direction, and the knob base is provided with a plurality of third magnets having a second predetermined radius based on a center of rotation and arranged at equal intervals along a circumferential direction, the number of third magnets equaling to the number of the second magnets.

5. The user interface device of claim 4, wherein the knob includes a hollow portion, and
an image displayed on the display is seen through the hollow portion.

6. The user interface device of claim 5, wherein the knob body is partially or entirely formed of a light-transmitting material, so that the image displayed on the display may be seen through the knob body.

7. The user interface device of claim 4, wherein polarities of the plurality of second magnets and the plurality of third magnets are arranged in a direction in which attractive force is applied to each other.

\* \* \* \* \*